United States Patent [19]
Chen

[11] Patent Number: 5,898,818
[45] Date of Patent: Apr. 27, 1999

[54] WATER FEED SYSTEM AT CONSTANT TEMPERATURE KEEPING THE HOT WATER FROM MIXING WITH THE COLD WATER FED DURING USE OF THE HOT WATER IN A SINGLE TANK

[76] Inventor: Chun-Liang Chen, 4 Fl., No. 14, Sub-Lane 10, Lane 583, Jong-Iang No. Rd., Pei-Tou, Taipei, Taiwan

[21] Appl. No.: 08/926,400

[22] Filed: Sep. 9, 1997

[51] Int. Cl.$^6$ .................................................. A47J 27/00
[52] U.S. Cl. ...................... 392/449; 392/441; 392/443; 392/451; 392/454; 126/344; 126/362
[58] Field of Search ................................... 392/441, 443, 392/449, 451, 450, 454; 126/362, 344, 373

[56] References Cited

U.S. PATENT DOCUMENTS

| | | | |
|---|---|---|---|
| 3,891,817 | 6/1975 | Brown | 219/10.55 R |
| 5,006,689 | 4/1991 | Kurachi et al. | 392/450 |
| 5,067,170 | 11/1991 | Nagachima et al. | 392/461 |

*Primary Examiner*—Teresa Walberg
*Assistant Examiner*—Thor S. Campbell
*Attorney, Agent, or Firm*—Bucknam and Archer

[57] ABSTRACT

A water feed system at constant temperature keeping the hot water from mixing with the cold water in a single tank, the cold water being fed during use of the hot water, comprising a cold water filing tube, a solenoid of controlling circuit and a double layer type hot water means with a single tank, characterized in that: a cold water flexible container such as a bag is provided above a hot water storage tank, a cold water feed tube is provided on the upper portion of the cold water container; and a cold water discharging tube is connected to the single hot water storage tank, whereby under the control of a control circuit, upon use of the hot water, the cold water is fed into the closed means above the hot water storage tank while upon nonuse of the hot water, the cold water in the flexible container is compressed into the hot water storage tank, thereby keeping the hot water in the hot water storage tank at a predetermined level.

11 Claims, 6 Drawing Sheets

WATER FEED SYSTEM AT CONSTANT TEMPERATURE KEEPING THE HOT WATER FROM MIXING WITH THE COLD WATER FED DURING USE OF THE HOT WATER IN A SINGLE TANK

BACKGROUND OF THE INVENTION

This invention relates to a water feed system at a constant temperature keeping the hot water from mixing with the cold water fed during use of hot water, particularly to a water feed system adapted to heat storage type hot water tank of flushing type toilet, electric water heater and drinking machine. During use of the hot water, the cold water is firstly fed into closed flexible means in a single hot water tank. The flexible means will then lower down, as the cold water increases and the hot water decreases. Upon nonuse of hot water, the cold water discharging tube is caused to open by the control circuit. Under the external force, the cold water stored inside the closed means will flow out of the discharging tube into the hot water tank whereby the hot water is kept from mixing with the cold water fed during use of the hot water.

The conventional water heater which electrically heats the cold water, for example, the heat storage type hot water tank of the flushing type toilet, provides a cold water feed system in which upon flushing with the hot water, the cold water is made up into the hot water tank. After a lapse of long while for continual use, the cold water will increase while the hot water will decrease, as a result of which the water thus mixed will get colder. To solve this problem, an electric current and a voltage of greater power ratio are used to instantaneously heat. For they use specific high voltage and electric current, the drawbacks such as the complicacy in fitting, the difficulty in execution, the costliness in enlarging the equipment, the highness in the failure rate of the equipment and the lack in safety due to the overload of electric current are apparent. As to drinking machine, while the cold water and the hot water may be respectively used, a cold water tank and a hot water tank are required, as a result of which the volume of the machine will increase to occupy a larger space and the cold water insufficient for a long time will cause an adverse effect.

To obviate the above drawbacks, this invention provides a single tank type water feed system keeping the hot water from mixing immediately with the cold water fed during use of the electrically heated water wherein closed means is provided on the upper portion inside the single tank hot water container for the cold water to feed therein during use of the hot water, at the same time of which a control circuit actuates the electromagnetic valve in the discharging tube to a closed position; upon nonuse of the hot water, the control circuit actuates the electromagnetic valve in the discharging tube to an open position, whereby the effect of the external force applied upon the cold water stored in advance in the closed means decreases and the cold water is fed into the hot water storage tank from the discharging tube communicated with the closed means. After the closed space is totally compressed, that is, after the cold water in the flexible space is totally pushed into the hot water storage tank, the cold water will stop feeding, and the cold water fed will be heated by the heater to maintain the hot water within a predetermined temperature. Therefore, the cold water will not mix with the hot water during use of the hot water. And upon nonuse of the hot water, the cold water is fed again and heated to a predetermined temperature so as to be ready for use.

SUMMARY OF THE INVENTION

Therefore, one object of this invention is to provide a water feed system at constant temperature keeping the hot water from mixing with the cold water fed during use of hot water wherein closed means has flexible or expansion function and may store temporarily the cold water, whereby under the control of a control circuit, upon use of the hot water, the cold water is fed into the closed means above the hot water storage tank while upon nonuse of the hot water, the cold water in the flexible container is pushed into the hot water storage tank, thereby keeping the hot water in the hot water storage tank at a predetermined level.

Another object of this invention is to provide a single storage tank unnecessitating the additional provision of a cold water storage tank and a hot water storage tank to save the space volume of the electric water heater and prevent from idle heater which may cause a fire.

Still another object of this invention is to provide a water feed system keeping the hot water from mixing with the cold water fed during use of the hot water wherein the closed means above the hot water storage tank in a flexible container which is usually a bellow formed of the synthetic resin, and a floating disc on the bottom portion of the bellow, the floating disc being formed of the material such as aquatic sponge or foam polyethylene; the flexible container may also be a bag shaped body inherent of flexibility. The cold water bag may be freely flexible depending on the feeding or discharging of the cold water container.

The other objects and feature will be more apparent from the following description with reference to the accompanying drawings wherein:

A BRIEF DESCRIPTION OF THE DRAWINGS

DETAILED DESCRIPTION OF THE INVENTION

Figure 1:
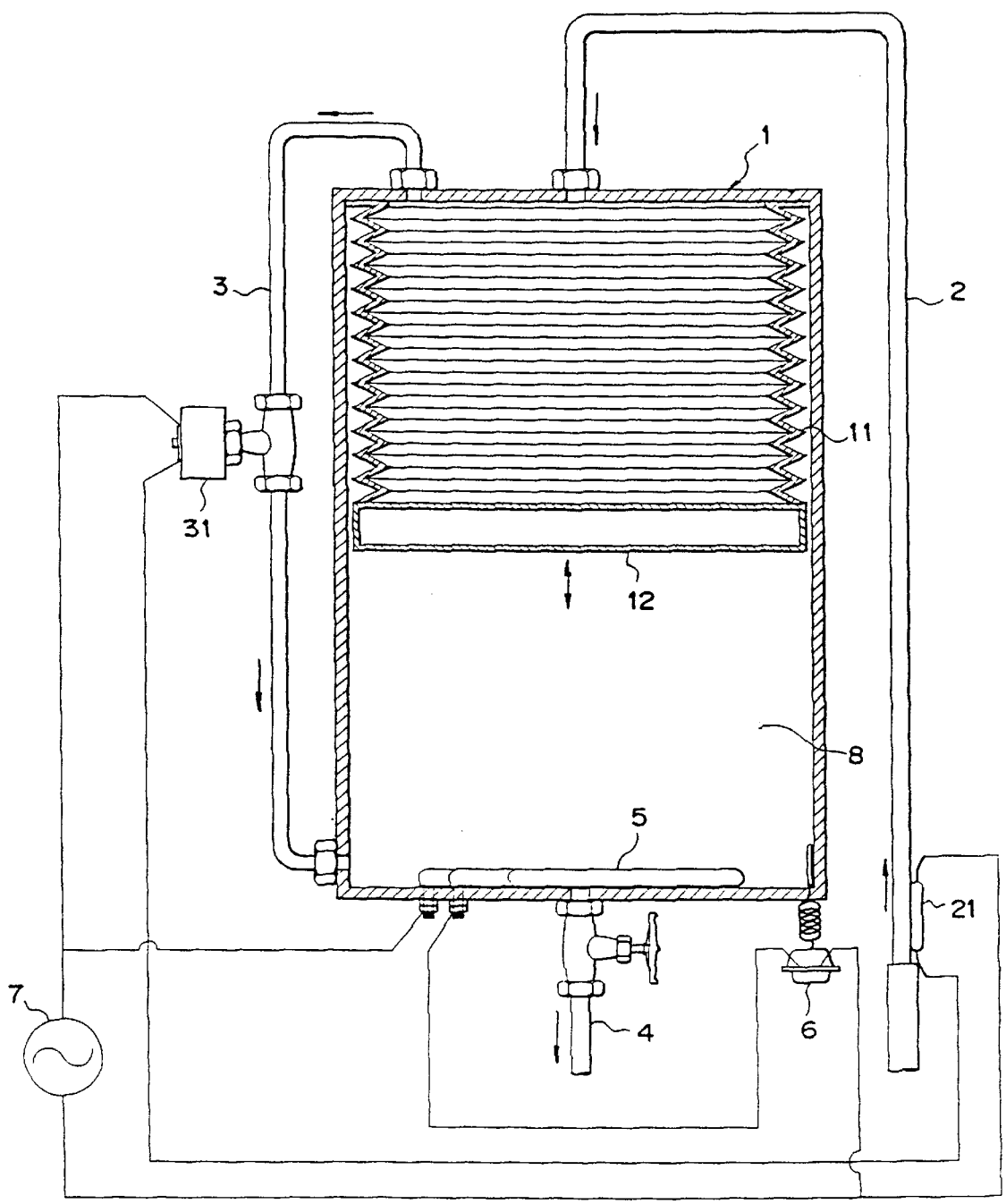
FIG. 1 is schematic view showing a single tank type water feed system keeping the hot water from mixing the cold water fed during use of hot water on a stage according to this invention.

Referring to FIG. 1, a hot water storage tank is designated with 1, a cold water filling tube 2, a cold water discharging tube 3, a hot water conveying tube 4, an electric heater 5, a thermostat 6, and a power source 7. As illustrated, a control circuit comprises solenoid 21, an electromagnetic valve 31 connected to the cold water discharging tube 3, the electric heater 5 provided on the bottom of the hot water storage tank 1, the thermostat 6 and the power source 7.

The primary object and feature of this invention is to provide a single hot water storage tank 1 in which a flexible cold water container 11 such as a sac is suspended on the top portion to form a closed device whereby the cold water which is fed into the flexible container 11 inside the hot water storage tank 1 through the cold water filling tube 2 during the hot water level inside the hot water storage tank is lowered down for use of the hot water will not mix with the hot water. Hence, the hot water is a hot water area 8 is kept at a predetermined temperature to be discharged. As the cold water is fed into the flexible container 11, the solenoid 21 is actuated by the water flow. The cold water discharging tube 3 is then closed by the electromagnetic valve 31 which is turned off by the control circuit. The space emptied for the fact that the hot water inside the hot water storage tank 1 decreases, that is, the water level lowers down, will be occupied all the time by the flexible container 11 which subsequently falls down due to gravity. Thus, while part of the hot water inside the hot water storage tank 1 has been discharged for use, the flexible container 11 will lower down for the residual hot water to enclose the flexible container all the time. Once ceasing use of the hot water, the cold water flexible container 11 will be compressed by the residual hot water under the effect of floating force, as a result which the electromagnetic valve 31 will be opened for the cold water to flow into the hot water storage tank 1 through the cold water discharge tube 3 as make-up water. Thus the object to prevent the cold water from mixing with the hot water is achieved. According to the water feed system of the water heater with a single tank of this invention, with the provision of the control circuit which comprises the solenoid 21 and the electromagnetic valve 31, during use of the hot water, that is, during the hot water is discharged through the hot water discharging tube 4, the cold water fed in will flow into the cold water flexible container 11 provided on the upper portion inside the hot water storage tank 1 through the cold water filling tube 2. At the same time when the cold water is fed in through the cold water filling tube 2, the solenoid 21 will be turned on to actuate the electromagnetic valve 31 to close the cold water discharging tube 3. Subsequently after the hot water levels lower down, the cold water fed into the flexible container will increase and extend toward the bottom of the tank. Upon ceasing use of the hot water, the cold water filling tube 2 will stop feeding and the stoppage of the water flow will turn off the solenoid 21. Then, the electromagnetic valve 31 in the cold water discharging tube 3 will be opened. The floating force of the residual hot water in the hot water area 8 as well as around the cold water flexible container 11 and the restitution force of the flexible container will act upon the cold water flexible container 11 which will therefore float up in a compressed manner. The cold water will then flow out of the flexible container 11 to the lower portion at the left side of the hot water storage tank 1 along the cold water discharging tube, where it will flow into the hot water area 8.

Then the water level in the hot water area 8 will arise to fill the space emptied by the lifted flexible container 11 till the cold water is totally fed into the hot water area 8. Next, a floating disc 12 provided on the bottom of the flexible container will reach to the top portion of the tank to automatically stop feeding water. The temperature lowered down by the cold water fed into the hot water area will be sensed by the thermostat 6, as a result of which the electric heater 5 will be turned on to heat up to a predetermined temperature for the water ready to be used next time.

Figure 2:
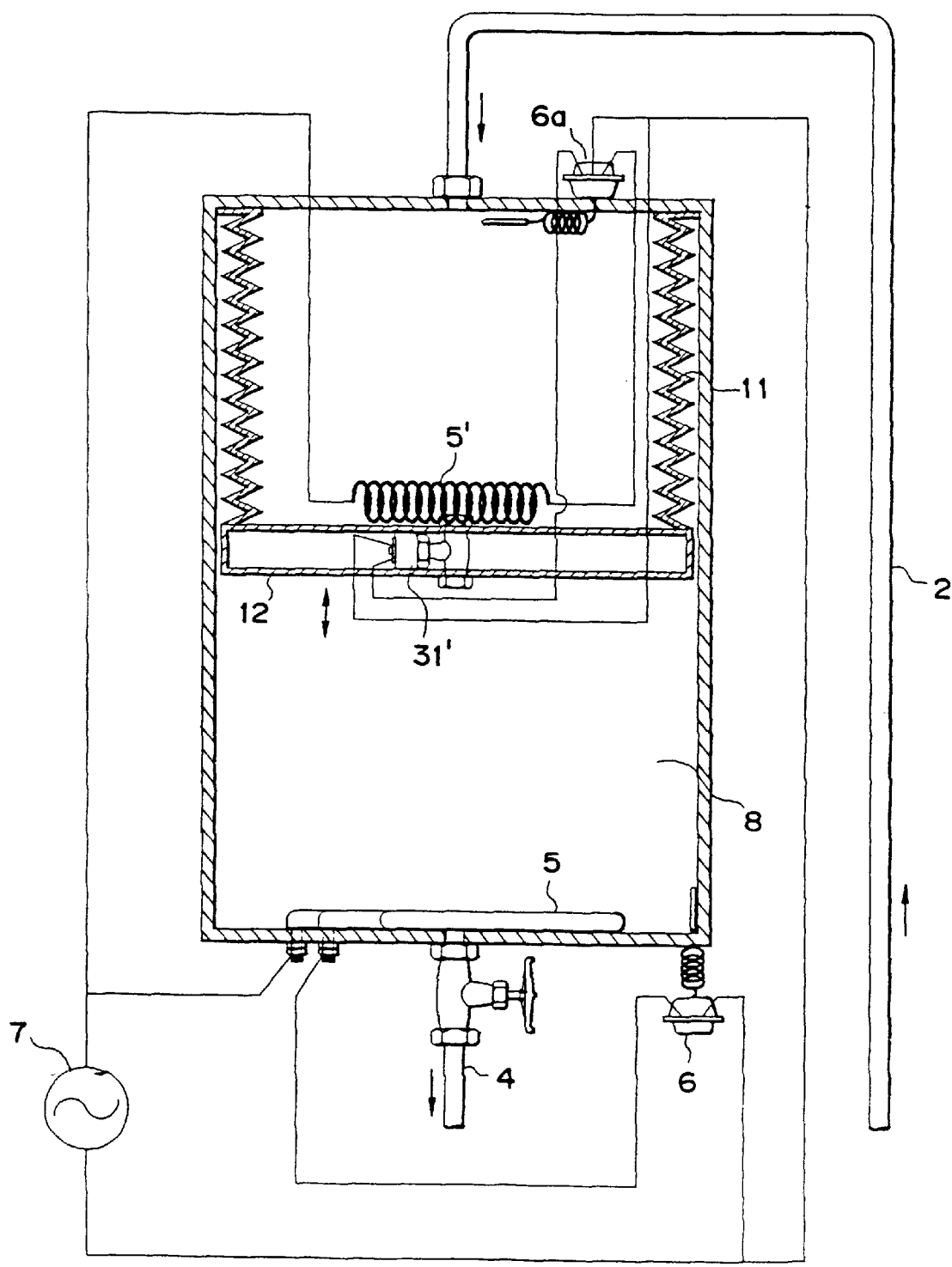
FIG. 2 is a first alternative structure of a single tank type water system as shown in FIG. 1.

FIG. 2 shows a first alternative structure of a water feed system preventing the cold water from mixing with the hot water as shown in FIG. It permits the cold water temporally stored in the flexible container 11 to be heated in advance before being discharged into the hot water area 8. In case of using the hot water heat in shower, upon ceasing use of the water, the water supplied into the hot water area 8 in the same manner as shown in FIG. 1 is also a hot water. It ensures that there is no necessity for the residual hot water mixed with the newly fed water to heat up for a while as shown in FIG. 1. Like parts of FIG. 1 and FIG. 2 are designated with like reference numbers. The structure as shown in FIG. 2 is the same as that as shown in FIG. 1 except that the control circuit further comprises an electric heater 5' provided in the cold water flexible container 11 and an electromagnetic valve 31' directly mounted inside the floating disc 12. As shown in FIG. 1, during the hot water in the hot water area 8 is discharged for use through the hot water discharging tube 4, the hot water level in the hot water area 8 will lower down due to the discharge of the hot water, as a result of which the flexible container 11 will lower down and the cold water will simultaneously feed into the flexible container 11 through the cold water filling tube 2. The thermostat 6a sensing out the temperature of the cold water permits an electric current to flow into the electric heater 5' to heat the cold water in the flexible container. When the cold water is heated up to a predetermined temperature, the thermostat 6a will switch off the electric heater 5' and simultaneously actuate the electromagnetic valve 31' to an opened position. As described above, the floating force of the hot water in the hot water area 8 and the restitute force of the flexible container 11 will combine to act upon the flexible container 11 and the floating disc 12 for the flexible container 11 to float up in a compressed manner whereby the heated water in the flexible container flows into the hot water area 8 as a make-up water. For the temperature of the water fed in is the same as that of water in the hot water area, a lapse of time for the water to be heated is unnecessitated. Such a structure which heats the cold water in the flexible container 11 in advance is particularly suitable for use in electric drinking machine which guarantees a ready use of the boiled water all the time.

Figure 3:
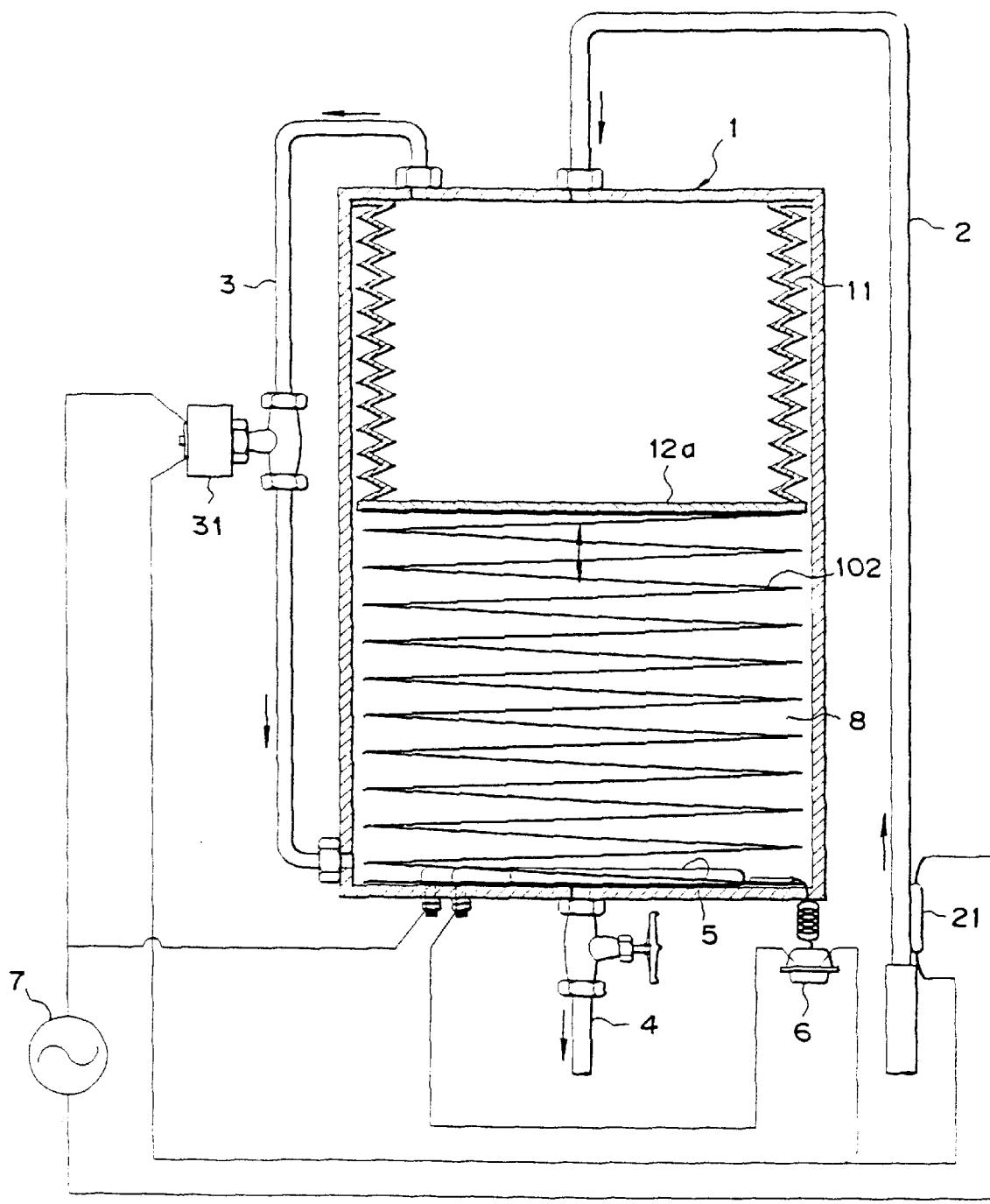
FIG. 3 is a second alternative structure of a single tank type water system as shown in FIG. 1.

FIG. 3 shows a second alternative structure of a water feed system preventing the cold water from mixing with the hot water as shown in FIG. 1. The structure as shown in FIG. 3 is the same as that in FIG. 1 except that a tension spring 102 is disposed between the bottom portion of the hot water storage tank 1 and the bottom portion of the flexible container 11. The tension spring 102 with a resilient returning force in place of the floating disk 12 which is inherent of a floating force may obtain an equivalent effect.

Figure 4:
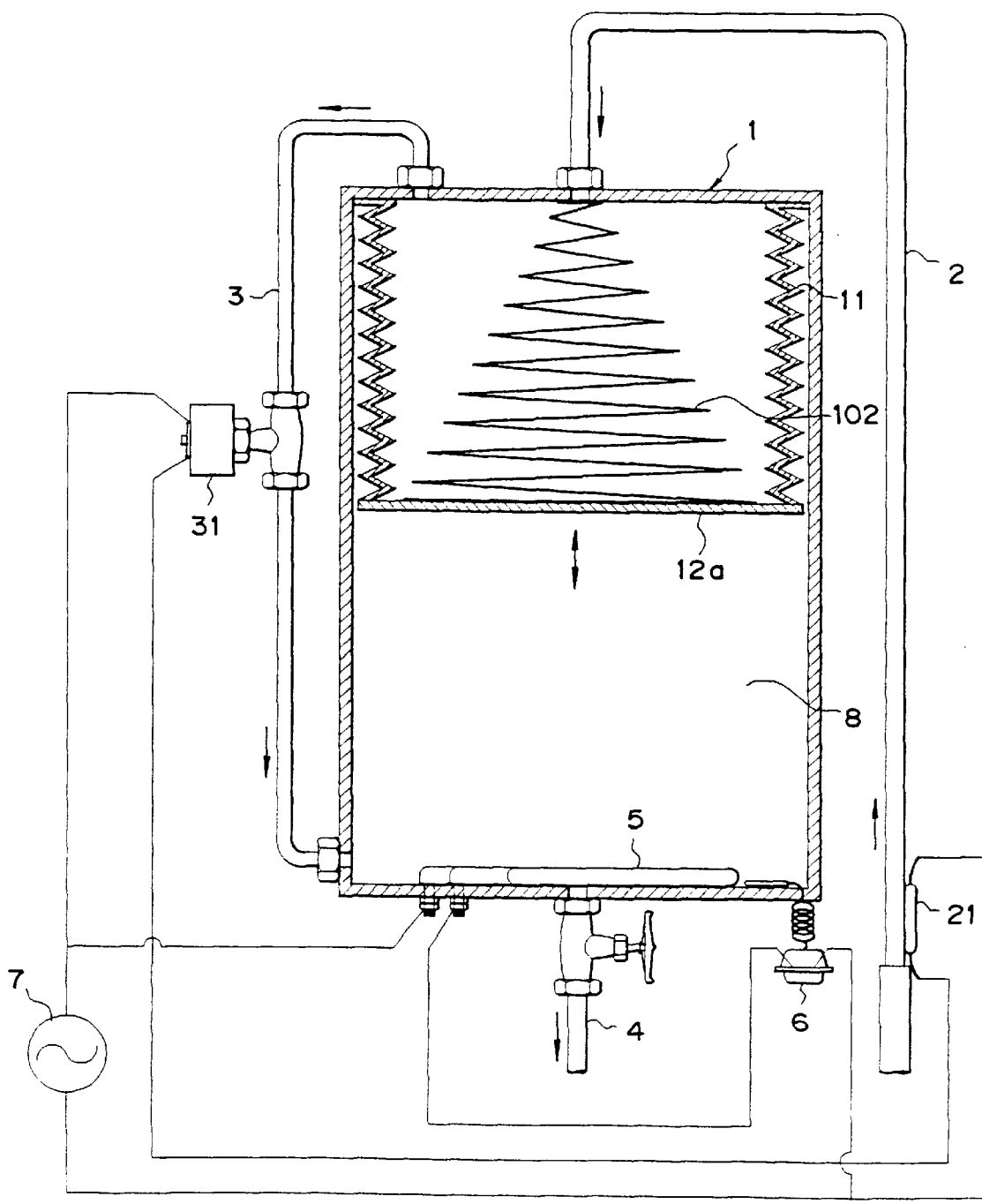
FIG. 4 is a third alternative structure of a single tank type water system as shown in FIG. 1.

FIG. 4 shows a third alternative structure of a water feed system preventing the cold water from mixing with the hot water as shown in FIG. 1. The structure as shown in FIG. 4 is the same as that in FIG. 1 except that a coil spring 102 is provided between the bottom portion of the flexible container 11 and the top portion of the hot water storage tank 1. The inner ring of the coil spring 102 is secured onto the inner top portion of the hot water storage tank 1, while the outer ring thereof is secured onto the inner and surface of the floating disc 12a on the bottom portion of the flexible container 11. The coil spring 102 with a resilient returning force in place of the floating disk 12 on the bottom portion of the flexible container 11 obtains an equivalent effect.

Figure 5:
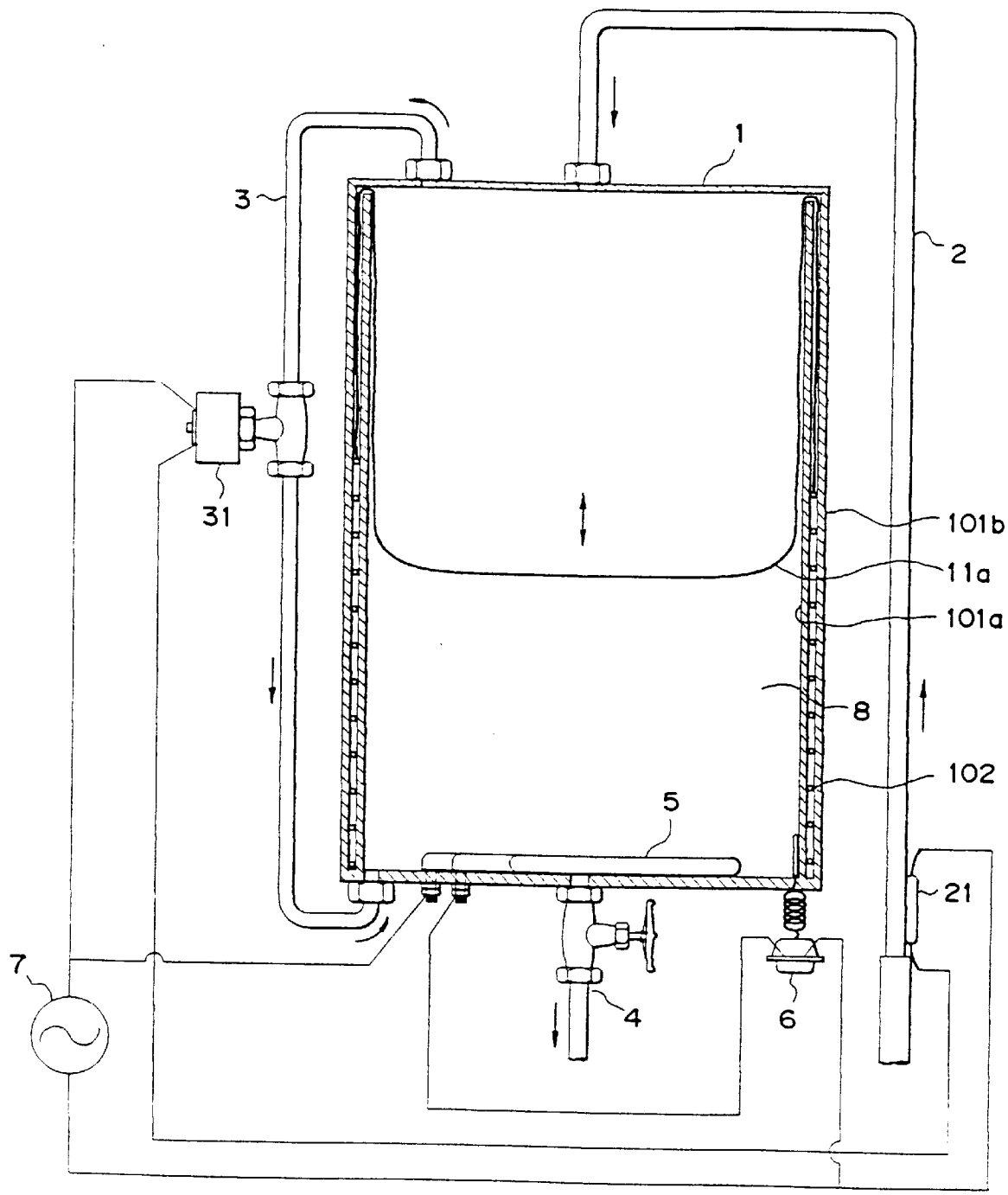
FIG. 5 is a fourth alternative structure of a single tank type water system as shown in FIG. 1.

FIG. 5 shows a fourth alternative structure of a water feed system preventing the cold water from mixing with the hot water as shown in FIG. 1. The main differences therebetween are as hereinafter described. A silicon gel bag 11a is provided in place of the flexible container 11 as shown in FIG. 1. The hot water storage tank 1a is formed with an inner wall 101a and an outer wall 101b separated by a clearance, the silicon gel bag 11a is connected at an open end with one end of a spiral spring 102 disposed inside the clearance. The outer end of the spiral spring 102 is secured on the bottom portion of the clearance whereby the silicon gel bag 11a tends to be pulled toward the clearance all the time. As described above, after the hot water in the hot water area is discharged through the hot water discharging tube 4, the cold water is fed into the silicon gel bag through the cold water filling tube 2. The silicon gel bag 11a with the water therein will overcome the resilient force of the spiral spring 102 to lower down in subsequence to the step in which the hot water level lowers down. Upon the stoppage of hot water discharge, the floating force caused by the hot water in the hot water area 8 and the returning force of the spiral spring 102 will combine to pull up the silicon gel bag 11a. Simultaneously the cold water in the silicon gel bag 11a will be compressed to flow into the hot water area 8 through the cold water discharging tube 3.

Figure 6:
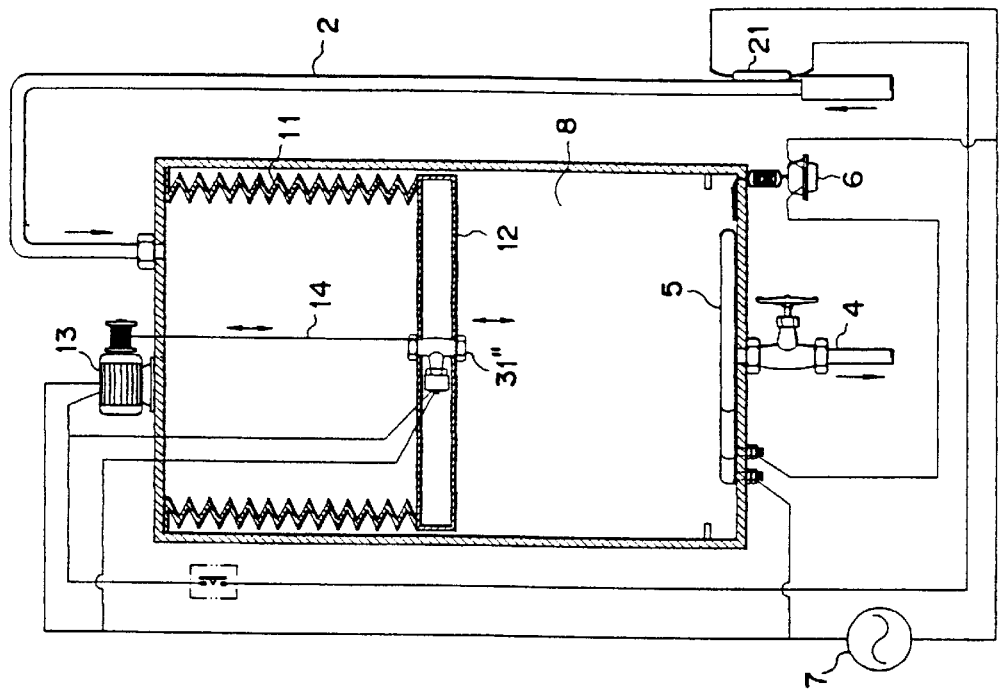
FIG. 6 is a fifth alternative structure of a single tank type water system as shown in FIG. 1.

FIG. 6 shows a fifth alternative structure of the water feed system at constant temperature according to this invention. A small motor 13 further provided is connected to the floating disc of the flexible container 11 with for example a nylon thread or a fine steel wire 14. When the hot water in the hot water area 8 is discharged through the hot water discharging tube 4, the hot water level will lower down while the cold water will flow into the flexible container 11 through the cold water filling tube 2. The cold water in the tube will actuate the solenoid 21 to close the electromagnetic valve 31 mounted on the floating disk 13. Upon stoppage of the discharge from the hot water discharging tube 4, the solenoid 21 will rotate the motor 13 and reopen the electromagnetic valve 31'. The floating force of the hot water in the hot water area 8 and the force output by the motor 13 to pull up the floating disc 12 will combine for the cold water in the flexible container 11 to flow into the hot water area 8 through the opened electromagnetic valve 31' to mix with the residual hot water and be heated to a predetermined temperature by the electric heater 5. After the motor 13 pulls up the flexible container 11 to a predetermined height, it may be stopped by a microswitch which is conventional and therefore needs no detailed description.

Figure 7:
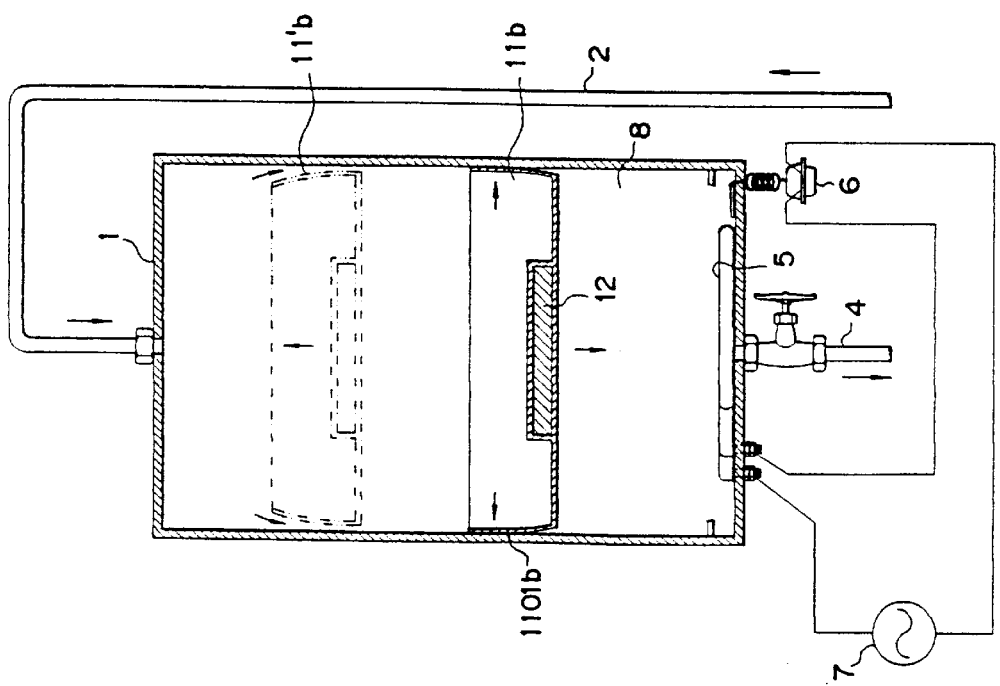
FIG. 7 is a sixth alternative structure of a single tank type water system as shown in FIG. 1.

FIG. 7 shows a sixth alternative structure of the water feed system at constant temperature according to this invention. A silicon gel disc is disposed within the hot water storage tank 1. The silicon gel disk 11b in the shape of a round disc has a diameter slightly smaller than the inner diameter of the hot water storage tank 1 and is provided with a protruded edge 1101b around the periphery thereof. Usually, the diameter of the open end of the protruded edge 1101b is smaller than the lower portion thereof. As shown in FIG. 7, as the hot water is discharged through the hot water discharging tube 4, the cold water, subsequent to the lowering down of the silicon gel disc 11b, starts to flow into a sealed space formed by the silicon gel disc 11b. Under the static pressure applied by the cold water in the space above the silicon gel disc 11b, the open end of the protruded edge 1101b of the silicon gel disc 11b is forced open to press against the inner wall of the hot water storage tank 1. Acted by the weight of the cold water, the silicon gel disc 11b, subsequent to the lowering down of the water level in the hot water area 8, will lower down along the inner wall. Since under the static pressure applied by the cold water the protruded edge 1101b presses against the inner wall of the hot water tank 1, the cold water may be prevented from discharging into the hot water area 8 at the lower portion to mix with the hot water in the midway it lowers down.

Upon stopping use of the hot water, the floating force of the hot water in the hot water area 8 will act upon the silicon gel disc 11b for it to rise up to compress the cold water above the silicon gel disc 11b. For the force acted on the outer surface of the protruded edge 1101b by the pressure of compressed cold water on the inner wall thereof plus the returning force of the protruded edge 1101b is greater than the force acted on the inner surface of the protruded edge by the pressure of the cold water, the cold water in the space above the silicon gel disc 11b, as shown by a broken line in FIG. 7, will be discharged from between the protruded edge and the inner wall to flow into the hot water area 8 thereunder as a make-up water. The thermostat 6 will then actuate the electric heater 5 to heat the water up to a predetermined temperature.

As described above, the variation in position and size caused by the flexible container, silicon gel bag, motor and silicon gel disc according to this invention results in that the enclosed space decreases in volume, whereby the temporarily stored cold water may be pressed in the hot water area during nonuse of the hot water to prevent the water temperature from dropping down for the fact that the cold water and the hot water should be mixed with each other all the time during use of the hot water.

What is claimed is:

1. A water feed system at constant temperature keeping the hot water from mixing with the cold water fed during use of the hot water in a single tank, comprising:

a closed single tank type hot water storage means, provided with heating means therein; and closed means for temporarily storing cold water, mounted on the inner top portion of said hot water storage means to keep the cold water temporarily stored as well as fed through a tube from mixing with the hot water in said tank right away;

characterized in that means for varitying the position or size of said closed means is provided whereby when the cold water stops feeding or after the cold water is heated to a predetermined temperature, the cold water temporarily stored may be discharged into said single tank type hot water storage means to be heated to a predetermined temperature.

2. A water feed system as claimed in claim 1, wherein said closed means is a flexible container formed of rubber or gel and is a resilient bellow having a bottom portion.

3. A water feed system as claimed in claim 2, wherein the flexible means used in the cold water flexible container is a bellow shaped body, and as a closed container, it is connected at the top portion thereof with a cold water filling tube and a cold water discharging tube.

4. A water feed system as claimed in claim 3, wherein a control circuit is provided, said control circuit comprising a solenoid provided in a tube through which the cold water is fed into said flexible container;

an electromagnetic valve provided in another tube through which the cold water is discharged into said hot water storage means from said flexible container;

an electric heater provided on the bottom portion of said hot water storage means;

a thermostat; and a power source;

whereby during the hot water is discharged from said hot water storage means, the cold water flows into said flexible container to fill the space emptied due to the discharge of hot water; under the cold water pressure, said solenoid is turned on to actuate said electromagnetic valve to a closed positioned where the cold water will not flow into said hot water storage means from said flexible container and the cold water and the hot water will not mix with each other; and upon ceasing use of the hot water, the cold water will stop feeding for said solenoid to be turned off and said electromagnetic valve to be opened whereby the cold water stored in advance in said flexible container starts to flow into said hot water storage means and a thermostat effected by a temperature difference actuates said electric heater to heat said hot water area.

5. A water feed system as claimed in claim 4, wherein an electromagnetic valve is directly mounted on the bottom portion of said closed flexible container, the on or off position of said electromagnetic valve being controlled by said solenoid.

6. A water feed system as claimed in claim 2, wherein a floating disc is mounted on the bottom portion of said flexible container.

7. A water feed system as claimed in claim 2, wherein a tension spring is disposed between the lower portion of said flexible container and the bottom portion of said hot water storage means.

8. A water feed system as claimed in claim 2, wherein a coil spring is provided within said flexible container; and an inner ring of said coil spring is secured on the inner top portion of said hot water storage means, while an outer ring is secured to the inner end surface of the bottom portion of said flexible container.

9. A water feed system as claimed in claim 2, wherein flexible means used in cold water flexible container is a bellow typed container; and said flexible means as a closed container is connected at the top portion with a cold water filling tube, while a floating disk is mounted on the bottom portion of said flexible container; an electric heater is secured onto said floating disc and an electromagnetic valve is provided through said floating disc; a thermostat is provided in said flexible container, while another electric heater and another sensor are provided on the bottom portion of said hot water storage means;

whereby as the hot water is discharged from said hot water storage means, the cold water flows into said flexible container;

said thermostat in said flexible container actuates said electromagnetic valve on said floating disc to close the passage for the cold water to flow into said hot water storage means from said flexible container and the cold water in said flexible container is heated by said heater; however, upon nonuse of the hot water, said electromagnetic valve in said flexible container opens and heated water stored in advance in said flexible container starts to flow into said hot water storage means.

10. A water feed system as claimed in claim 1, wherein said hot water storage means is provided with an inner wall and an outer wall separated by a clearance therebetween, one end of flexible means acted thereon by a resilient returning force is secured onto the bottom portion within the clearance; and a silicon gel bag is provided with an open end folded into the clearance to connect with another end of said flexible means, whereby after cold water is fed, under the resilient returning force caused by said flexible means, said silicon gel bag will decrease in volume.

11. A water feed system as claimed in claim 2, wherein a small motor is secured on the exterior of said hot water storage means and said small motor is connected to the bottom portion of said flexible container with a nylon thread whereby said flexible container pulled by said motor will be compressed.

* * * * *